US012261382B1

(12) United States Patent
Guo et al.

(10) Patent No.: US 12,261,382 B1
(45) Date of Patent: Mar. 25, 2025

(54) VIBRATION RESISTANT SOCKET TERMINAL AND PLUG TERMINAL

(71) Applicant: Henan THB Electric Co., LTD., Henan (CN)

(72) Inventors: Desui Guo, Hebi (CN); Jincan Kang, Hebi (CN); Yanpeng Wang, Hebi (CN); Wujun Wang, Hebi (CN); Guoqiang Chen, Hebi (CN); Sai Chen, Hebi (CN); Pingtang Zhao, Henan (CN); Houkun Li, Hebi (CN); Xin Wang, Hebi (CN); Jianli Kang, Hebi (CN); Shuisheng Chen, Hebi (CN); Hailing Cui, Hebi (CN); Ruiyang Xia, Hebi (CN); Shanlin Ping, Hebi (CN)

(73) Assignee: Henan THB Electric Co., LTD., Henan (CN)

( * ) Notice: Subject to any disclaimer, the term of this patent is extended or adjusted under 35 U.S.C. 154(b) by 0 days.

(21) Appl. No.: 18/760,825

(22) Filed: Jul. 1, 2024

(30) Foreign Application Priority Data

Sep. 26, 2023 (CN) ........................ 202311246068.3

(51) Int. Cl.

| | |
|---|---|
| ***H01R 13/00*** | (2006.01) |
| ***H01R 13/05*** | (2006.01) |
| ***H01R 13/11*** | (2006.01) |

(52) U.S. Cl.

CPC ........... *H01R 13/112* (2013.01); *H01R 13/05* (2013.01); *H01R 2201/26* (2013.01)

(58) Field of Classification Search

CPC ... H01R 13/112; H01R 13/05; H01R 2201/26

See application file for complete search history.

(56) References Cited

U.S. PATENT DOCUMENTS 5,122,081 A * 6/1992 Bogiel ................. H01R 13/422 439/595

6,554,634 B1 * 4/2003 Lin .......................... H05K 7/10 439/857

(Continued)

FOREIGN PATENT DOCUMENTS

CN 208589575 U 3/2019

CN 208797243 U 4/2019

(Continued)

OTHER PUBLICATIONS

China National Intellectual Property Administration, search report in CN2023112460683, Feb. 22, 2024, pp. 1-2.

(Continued)

*Primary Examiner* — Phuong Chi Thi Nguyen

(74) *Attorney, Agent, or Firm* — Cahn & Samuels, LLP

(57) ABSTRACT

The present invention relates to the technical field of automobile connector terminals, in particular to a vibration-resistant socket terminal and a vibration-resistant plug terminal. An interior of the socket terminal includes a first vibration damping body, and on an exterior of the socket terminal is a vibration damping arm. The plug terminal and the socket terminal are mutually plugged together. The plug terminal includes first and second contact pins arranged opposite to each other, and a second damping body is arranged between the first and second contact pins. The configuration directly improves the connector terminal, the first vibration damping body is arranged in the socket terminal to reduce vibration, meanwhile, the vibration damping arm is arranged on the spring plate portion of the socket terminal to increase the positive pressure of the socket terminal on the plug terminal; therefore, the socket terminal on the connector can provide the positive pressure (Continued)

enabling the plug terminal and the socket terminal to be stably plugged together.

16 Claims, 5 Drawing Sheets

(56) References Cited

U.S. PATENT DOCUMENTS

| | | | | |
|---|---|---|---|---|
| 6,776,669 | B2 * | 8/2004 | Krause | H01R 11/289 439/759 |
| 7,033,233 | B2 * | 4/2006 | Fujimoto | B23H 11/006 439/874 |
| 7,344,388 | B2 * | 3/2008 | Kreuter | H01R 4/184 439/82 |
| 7,614,921 | B2 * | 11/2009 | Sikora | H01R 11/286 439/756 |
| 7,749,030 | B1 * | 7/2010 | Smith | H01R 11/282 439/772 |
| 7,867,043 | B2 * | 1/2011 | Yuan | H01R 12/57 439/857 |
| 8,241,071 | B1 * | 8/2012 | Hayama | H01R 4/34 439/709 |

FOREIGN PATENT DOCUMENTS

| | | |
|---|---|---|
| CN | 210723464 U | 6/2020 |
| CN | 210779084 U | 6/2020 |
| CN | 213584254 U | 6/2021 |
| CN | 218123843 U | 9/2022 |

OTHER PUBLICATIONS

European Patent Office, English abstract for CN210723464U, printed on Jul. 2, 2024.

European Patent Office, English abstract for CN208589575U, printed on Jul. 22, 2024.

European Patent Office, English abstract for CN208797243U, printed on Jul. 22, 2024.

European Patent Office, English abstract for CN210779084U, printed on Jul. 22, 2024.

European Patent Office, English abstract for CN213584254U, printed on Jul. 22, 2024.

European Patent Office, English abstract for CN218123843U printed on Jul. 22, 2024.

* cited by examiner

VIBRATION RESISTANT SOCKET TERMINAL AND PLUG TERMINAL

I. FIELD OF THE INVENTION

The present invention relates to the technical field of automobile connector terminals, in particular to a vibration-resistant socket terminal and a vibration-resistant plug terminal.

II. BACKGROUND OF THE INVENTION

Connectors are important electronic components in automobiles and play a role in power and signal transmission. The conductive performance of the connectors affects the functionality of the electrical components in the vehicle and even affects driving safety. Each connector consists of two parts, a plug and a socket. The plugs and sockets usually comprise parts such as sheaths and terminals, wherein the terminals are generally made of metal and are important components for realizing the functions of connectors, and the functions of connectors are realized by the stable contact between the plug terminals and the socket terminals.

The bumps generated during the driving of the vehicle will cause vibration of the connector. The macroscopic vibration will change the stress state of the spring plate on the connector, and the positive pressure provided by the spring plate will change, which may cause the connector to fail instantly. The micro-movement between the terminals caused by microscopic vibration will cause the wear and tear of the terminal surface coating, accelerate the oxidation of the terminal surface, increase the contact resistance between the terminals, and thus cause the connector to fail. Vibration is a common and important factor causing connector failure, and during the driving of the vehicle, vibration and impact are inevitably generated. Automotive connectors need to withstand more severe vibration environments, so higher requirements are placed on the vibration resistance. Therefore, conducting vibration-resistant design for automotive connectors is an important technical requirement.

For example, the Chinese patent with the publication number CN210723464U discloses a suspension movable connector, comprising a socket body, guide columns, spring holes, socket terminal holes, socket movable columns, springs, socket terminals, mounting plate screws, a mounting plate, mounting plate screw holes, mounting plate cylinders, mounting plate square holes, a fixing plate, fixing plate screw holes, a fixing plate baffle, fixing plate screws, a plug body, plug terminal holes, plug guide holes, plug screw holes, plug terminals and plug fixing screws. The suspension movable connector comprises a socket body and a plug body, guide columns are fixedly and symmetrically arranged on the socket body, and a spring hole is formed in the guide column; socket terminal holes are fixedly formed in the upper end face of the socket body, socket movable columns are fixedly arranged on the socket body, socket terminals are installed in the socket terminal holes, one end of each spring is installed in the corresponding spring hole, the other end of each spring is fixed to the corresponding mounting plate cylinder, and the mounting plates are sleeved on the socket movable columns through the mounting plate square holes.

The vibration damping solution described in the above public document involves setting up springs on the socket housing body to reduce the vibrations. The springs keep the socket closely attached to the plug on the battery end, allowing the socket and the plug to move longitudinally together, thereby reducing frictional forces between the plug and socket on the battery. This indirectly reduces the vibration of the connector terminals. This application is an improvement on the connector housing body, while the stable contact between the plug and socket depends on the stable positive pressure provided by the socket terminal spring plate. The positive pressure of the socket terminal spring plate in this application has not changed, this application relies on improvements to the connector housing body to achieve stability between the plug and socket on the connector, without improving the inherent stability of the plug and socket themselves, and the socket terminal spring plate cannot provide the positive pressure enabling the plug terminal and the socket terminal to be stably plugged.

III. SUMMARY OF THE INVENTION

In view of the shortcomings in the above Background of the Invention, the present invention provides a vibration-resistant socket terminal and a vibration-resistant plug terminal, which solves the technical problem that the socket terminal on the connector in the prior art cannot provide the positive pressure enabling the plug terminal and the socket terminal to be stably plugged together.

The technical solution of the present invention is implemented as follows: a vibration-resistant socket terminal, wherein an interior of the socket terminal is provided with a first vibration damping body, and an exterior of the socket terminal is provided with a vibration damping arm.

Preferably, the socket terminal comprises a base body, an upper spring plate and a lower spring plate are relatively arranged on the base body, the first vibration damping body is provided inside the base body, and the vibration damping arm is provided on the exteriors of the upper spring plate and the lower spring plate.

Preferably, a socket tail portion is provided on the base body, the base body and the socket tail portion are integrally formed, the interior of the base body is a cavity, a folded edge and a clamping block are provided on the base body, the clamping block and the folded edge respectively clamp the front portion and bottom portion of the first vibration damping body, and the clamping block and the vibration damping arm are matched in a blocking manner.

Preferably, the vibration damping arm comprises connecting plates, a back plate is provided on the connecting plates, the two connecting plates are connected into one body through the back plate, the two connecting plates and the back plate form a U-shaped whole, the U-shaped whole is sleeved on the socket terminal, a front-end clamping plate is provided at an open end of the U-shaped whole, the front-end clamping plate and the clamping block are matched in a blocking manner, a top bend configured to clamp the first vibration damping body is provided at a top portion of the back plate, a vibration damping plate is provided at a top portion of the connecting plate, and the vibration damping plate is fitted with the upper spring plate or the lower spring plate.

Preferably, ends of the upper spring plate and the lower spring plate are both bent inward, and the top portion of the vibration damping plate is close to and tightly presses a bending point of the upper spring plate or the lower spring plate.

Preferably, the bending point of the upper spring plate and the bending point of the lower spring plate are symmetrical, and a distance between the top portion of the vibration damping plate and the bending point of the upper spring plate is 0.2 mm-0.5 mm.

Preferably, an arc groove is provided at a joint between the connecting plate and the vibration damping plate.

A vibration-resistant plug terminal, the plug terminal and the socket terminal are mutually plugged together, the plug terminal comprises a first contact pin and a second contact pin which are arranged opposite to each other, and a second vibration damping body is arranged between the first contact pin and the second contact pin.

Preferably, a groove for the second vibration damping body to be inserted into is formed between the first contact pin and the second contact pin, and a convex block for the second vibration damping body to clamp is provided on an inner wall of the groove.

Preferably, the first vibration damping body and the second vibration damping body each comprise an outer housing body, a cavity is provided inside the outer housing body, and an internal shock-absorbing filler is provided inside the cavity.

The present invention directly improves the connector terminal, the first vibration damping body is arranged on the socket terminal of the connector terminal to reduce vibration, meanwhile, the vibration damping arm is arranged on the spring plate portion of the socket terminal, and the positive pressure of the socket terminal on the plug terminal is increased through the vibration damping arm; therefore, the socket terminal on the connector can provide the positive pressure enabling the plug terminal and the socket terminal to be stably plugged, and the technical problem that the socket terminal on the connector in the prior art cannot provide the positive pressure enabling the plug terminal and the socket terminal to be stably plugged together is solved. The vibration damping plate, also functions as an energy-dissipating component, has the same width as the upper or lower spring plate, adheres to the outer side of the upper or lower spring plate and is further configured for energy dissipation and shock absorption. The first vibration damping body and the second vibration damping body are both provided with internal shock-absorbing fillers. When subjected to external vibration in any direction, the internal shock-absorbing fillers composed of particles can move and collide in the chamber to achieve energy dissipation. The vibration damping arm is fitted with the upper spring plate and the lower spring plate, which effectively increases the friction force between the vibration damping arm and the socket terminal, and is beneficial to improving the stability of fixing the vibration damping arm to the exterior of the socket terminal.

IV. BRIEF DESCRIPTION OF THE DRAWINGS

In order to better illustrate the embodiments of the present invention, the following will briefly introduce the drawings needed in the description of the embodiments, and it is obvious that the drawings in the following description are only a part of embodiments of the present invention, for those of ordinary skill in the art, other drawings may also be obtained based on these drawings without any inventive effort.

In the figures: 1—socket terminal; 11—socket tail portion, 12—upper spring plate, 13—clamping block; 14—the first box body; 15—folded edge; 16—lower spring plate; 17—base body; 2—plug terminal; 21—the first contact pin; 22—the second contact pin; 23—the first positioning convex block; 24—the second positioning convex block; 25—the third positioning convex block; 26—the fourth positioning convex block; 27—the second box body; 28—plug tail portion; 3—vibration damping arm; 31—vibration damping plate; 32—arc groove; 33—top bend; 34—front-end clamping plate; 35—back plate; 36—connecting plate; 4—the first vibration damping body; 5—the second vibration damping body; 6—outer housing body; 7—internal shock-absorbing filler.

V. DETAILED DESCRIPTION OF THE EMBODIMENTS

In the following, the technical solutions in the embodiments of the present invention will be clearly and completely described with reference to the drawings in the embodiments of the present invention, obviously, the described embodiments are only a part of the embodiments of the present invention, not all of the embodiments. Based on the embodiments in the present invention, all other embodiments obtained by a person of ordinary skill in the art without inventive efforts shall fall within the protection scope of the present invention.

Embodiment 1

Figure 1:
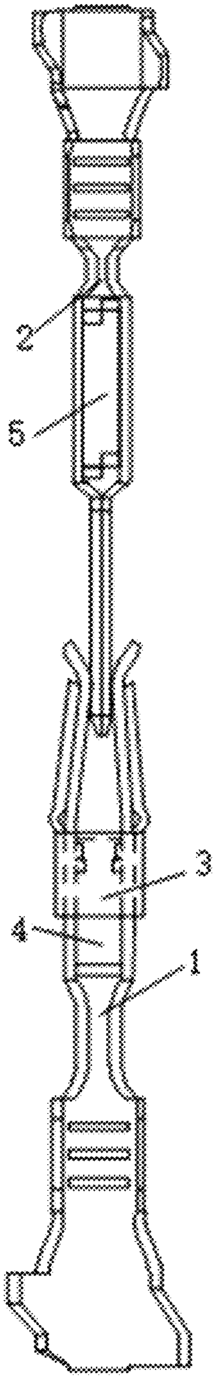
FIG. 1 is a schematic diagram of plugging of a socket terminal and a plug terminal of the present invention.
Figure 2:
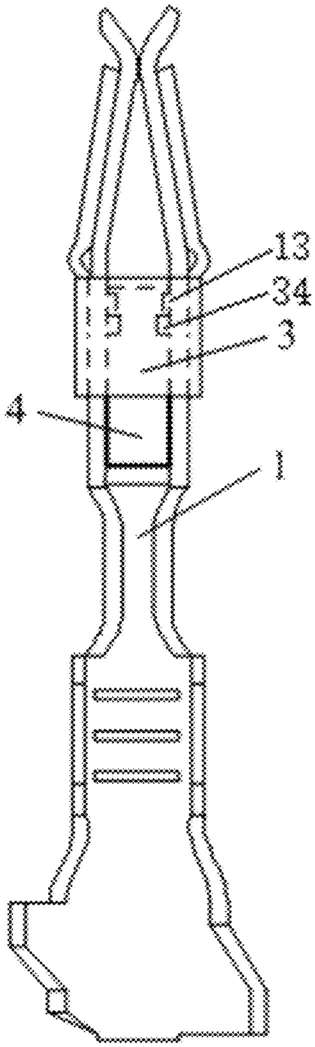
FIG. 2 is a schematic diagram of a connection among a socket terminal, the first vibration damping body and a vibration damping arm of the present invention.

As shown in FIG. 1 and FIG. 2, a vibration-resistant socket terminal is provided, an interior of the socket terminal 1 is provided with a first vibration damping body 4, and an exterior of the socket terminal 1 is provided with a vibration damping arm 3. The present invention directly improves the connector terminal, the first vibration damping body 4 is arranged on the socket terminal 1 of the connector terminal to reduce vibration, meanwhile, the positive pressure of the socket terminal 1 on the plug terminal 2 is increased through the vibration damping arm 3 arranged on the exterior of the socket terminal 1, so that the socket terminal 1 on the connector can provide the positive pressure enabling the plug terminal 2 and the socket terminal 1 to be stably plugged together, and the technical problem that the socket terminal on the connector in the prior art cannot provide the positive pressure enabling the plug terminal and the socket terminal to be stably plugged together is solved. At the same time, the vibration damping arm 3 is fitted with the spring plate portion of the socket terminal 1, which effectively increases the friction force between the vibration damping arm 3 and the socket terminal 1, and is beneficial to improving the stability of fixing the vibration damping arm 3 to the exterior of the socket terminal 1.

When the Embodiment 1 is implemented, the first vibration damping body 4 and the vibration damping arm 3 are provided on the socket terminal 1 of the connector terminal. After the socket terminal 1 is plugged into the plug terminal 2, the socket terminal 1 realizes shock absorption and energy dissipation through the first vibration damping body 4. At the same time, the vibration damping arm 3 provides sufficient positive pressure for the plugging of the socket terminal 1 and the plug terminal 2, thereby ensuring the stability of the connection between the socket terminal 1 and the plug terminal 2.

Embodiment 2

Figure 3:
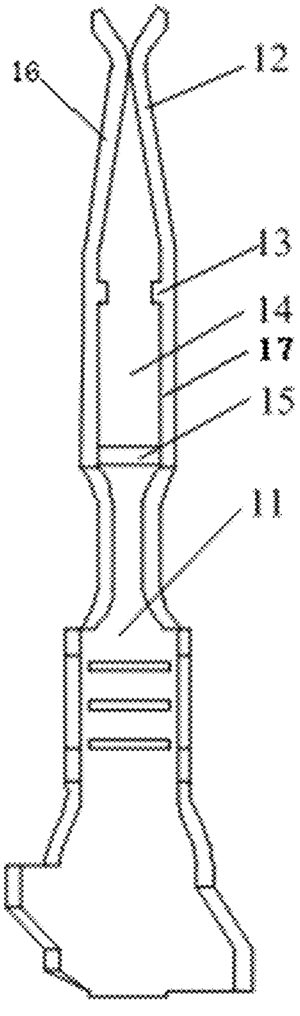
FIG. 3 is a schematic diagram of a socket terminal of the present invention.

Based on the Embodiment 1, as shown in FIG. 2 and FIG. 3, the socket terminal 1 comprises a base body 17, an upper spring plate 12 and a lower spring plate 16 are relatively arranged on the base body 17, the first vibration damping body 4 is provided inside the base body 17, and the vibration damping arm 3 is provided on the exteriors of the upper spring plate 12 and lower spring plate 16. The vibration damping arm 3 directly compresses the upper spring plate 12 and lower spring plate 16, providing additional positive pressure to compress the plug terminal for the upper spring plate 12 and lower spring plate 16, allowing the socket terminal to provide positive pressure enabling the plug terminal and the socket terminal to be stably plugged together. At the same time, the vibration damping arm 3 is fitted together with the upper spring plate 12 and lower spring plate 16, which effectively increases the friction force between the vibration damping arm 3 and the socket terminal 1, and is conducive to improving the stability of fixing the vibration damping arm 3 on the exterior of the socket terminal 1.

Embodiment 3

Based on the Embodiment 2, as shown in FIG. 2 and FIG. 3, a socket tail portion 11 is provided on the base body 17, the base body 17 and the socket tail portion 11 are integrally formed, the interior of the base body 17 is a cavity, a folded edge 15 and a clamping block 13 are provided on the base body 17, the clamping block 13 and the folded edge 15 respectively clamp the front portion and bottom portion of the first vibration damping body 4, and the clamping block 13 and the vibration damping arm 3 are matched in a blocking manner. A first box body 14 for the first vibration damping body 4 to insert is formed among the upper spring plate 12, lower spring plate 16, clamping block 13, and folded edge 15. The socket tail portion 11 is connected to the wire. The first box body 14 between the upper spring plate 12 and the lower spring plate 16 is correspondingly compressed and placed with the first vibration damping body 4, and the first vibration damping body 4 is limited to the first box body 14 through the clamping block 13 and folded edge 15, so that the first vibration damping body 4 is tightly fitted with the upper spring plate 12 and the lower spring plate 16, and the vibration is directly transmitted to the first vibration damping body 4.

Embodiment 4

Based on the Embodiment 3, as shown in FIG. 2, FIG. 3, FIG. 4, and FIG. 5, the vibration damping arm 3 comprises connecting plates 36, a back plate 35 is provided on the connecting plates 36, the two connecting plates 36 are connected into one body through the back plate 35, the two connecting plates 36 and the back plate 35 form a U-shaped hole, the U-shaped hole is sleeved on the socket terminal 1, a front-end clamping plate 34 is provided at an open end of the U-shaped hole, the front-end clamping plate 34 and the clamping block 13 are matched in a blocking manner, a top bend 33 configured to clamp the first vibration damping body 4 is provided at a top portion of the back plate 35, a vibration damping plate 31 is provided at the top portion of the connecting plate 36, and the vibration damping plate 31 is fitted with the upper spring plate 12 or the lower spring plate 16. The vibration damping plate 31 is fitted with the upper spring plate 12 or the lower spring plate 16, so that the additional positive pressure that can be provided by the vibration damping plate 31 is transmitted to the upper spring plate 12 or the lower spring plate 16. The vibration damping plate 31 is sleeved on the outside of the spring plate portion through the U-shaped hole, and the U-shaped hole is limited on the outer side of the spring plate portion through the front-end clamping plate 34. The vibration damping plate 31 has the same width as the upper spring plate 12 or the lower spring plate 16, the vibration damping plate 31 is fitted with the outside of the upper spring plate 12 or the lower spring plate 16, and the vibration damping plate 31 cooperates with the upper spring plate 12 or the lower spring plate 16 to achieve shock absorption and energy dissipation. The width of the top bend 33 is the same as that of the first box body 14 of the socket terminal, and has two functions. On the one hand, the two side surfaces of the top bend 33 are in contact with the two side surfaces of the root of the upper spring plate 12 or the lower spring plate 16, which has a certain supporting effect on the upper spring plate 12 or the lower spring plate 16, and can improve the stiffness of the upper spring plate 12 or the lower spring plate 16. On the other hand, the lower surface of the top bend 33 is a plane, and the first vibration damping body 4 matches with the folded edge 15 so as to realize the positioning and fixation of the first vibration damping body 4 in the first box body 14. During installation, the front-end clamping plate 34 is bent and clamped to the side wall of the first box body 14, immediately below the clamping block 13, to achieve installation and fixation of the vibration damping arm 3. The back plate 35 is a positioning component to achieve positioning and fixation of the first vibration damping body 4 at the bottom portion of the first box body 14. The front-end clamping plate 34 and the clamping block 13 are matched in a locking manner to improve the stability of fixing the vibration damping arm 3 on the exterior of the socket terminal 1.

Embodiment 5

Based on any one of Embodiments 2 to 4, as shown in FIG. 2 and FIG. 3, ends of the upper spring plate 12 and lower spring plate 16 are both bent inward, and the top portion of the vibration damping plate 31 is close to and tightly presses a bending point of the upper spring plate 12 or the lower spring plate 16. The ends of the upper spring plate 12 and the lower spring plate 16 are bent inward, and there is a space between the bent end of the upper spring plate 12 and the bent end of the lower spring plate 16 to match with the contact pin on the plug terminal 2. The ends of the upper spring plate 12 and the lower spring plate 16 are bent inward, so that the upper spring plate 12 and the lower spring plate 16 are both fold inward, further increasing the positive pressure provided by the socket terminal.

Embodiment 6

Based on the Embodiment 5, as shown in FIG. 2 and FIG. 3, the bending point of the upper spring plate 12 and the bending point of the lower spring plate 16 are symmetrical, and a distance between the top portion of the vibration damping plate 31 and the bending point of the upper spring plate 12 is 0.2 mm. That is, the distance between the top portion of the vibration damping plate 31 and the bending point of the upper spring plate 12 along the insertion direction of the plug terminal 2 is 0.2 mm. The distance is set at the top portion of the vibration damping plate 31 and the bending point of the upper spring plate 12 to prevent the vibration damping plate 31 from pressing against the bending point of the upper spring plate 12, causing the plug terminal 2 to not be inserted (plugged). The distance of 0.2 mm is selected to provide the maximum additional positive pressure without over-extruding the upper spring plate 12.

Embodiment 7

Figure 4:
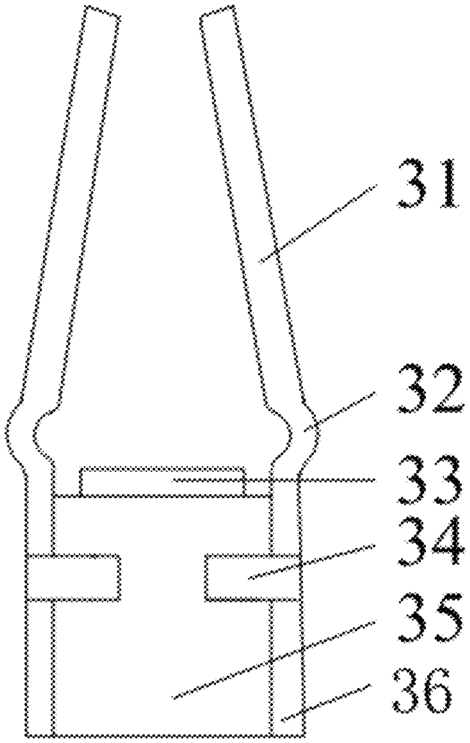
FIG. 4 is a front view of a vibration damping arm of the present invention.
Figure 5:
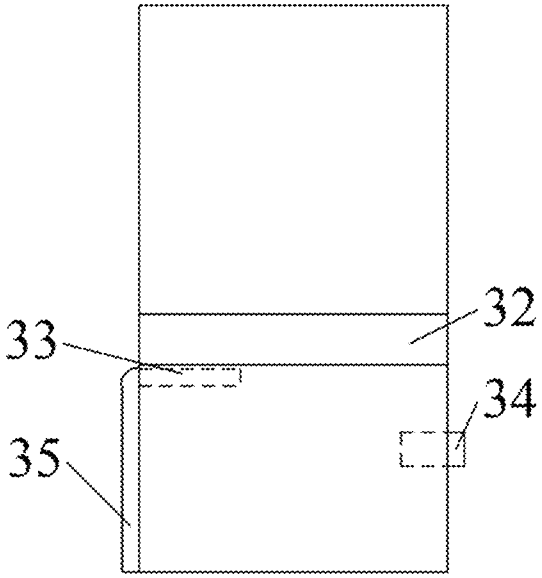
FIG. 5 is a side view of a vibration damping arm of the present invention.

Based on the Embodiment 4, as shown in FIG. 4 and FIG. 5, an arc groove 32 is provided at a joint between the connecting plate 36 and the vibration damping plate 31. The arc groove 32 is located at the bend of the root of the upper spring plate 12, so that the vibration damping plate 31 has good elasticity and can deform and reset the vibration damping plate 31 during vibration.

Embodiment 8

Figure 6:
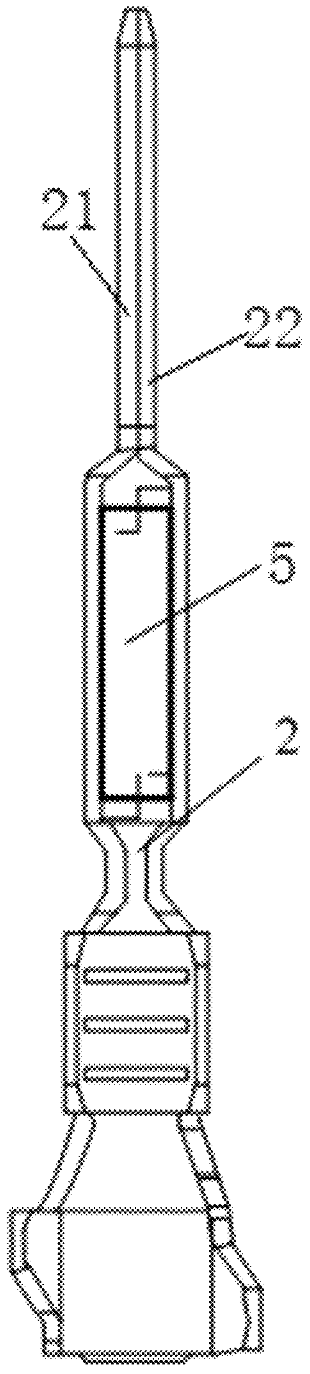
FIG. 6 is a front view of a plug terminal of the present invention.
Figure 7:
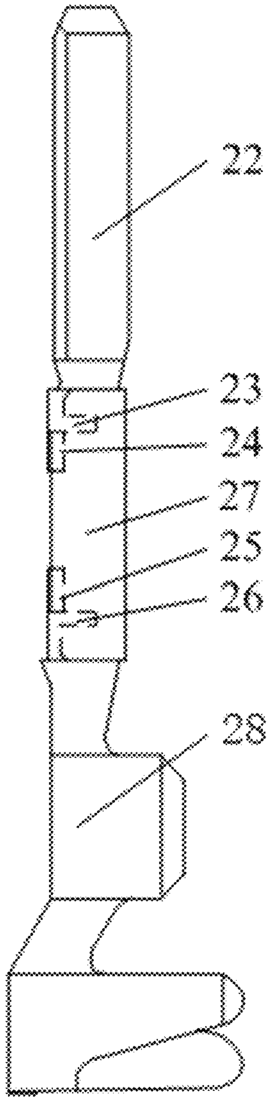
FIG. 7 is a side view of a plug terminal of the present invention.

Based on the Embodiments 6 or 7, as shown in FIG. 1, FIG. 6, and FIG. 7, a vibration-resistant plug terminal is provided, the plug terminal 2 and the socket terminal 1 as described above are mutually plugged together, the plug terminal 2 comprises a first contact pin 21 and a second contact pin 22 which are arranged opposite to each other, and a second vibration damping body 5 is arranged between the first contact pin 21 and the second contact pin 22. A second box body 27 is provided between the first contact pin 21 and the second contact pin 22, and the second vibration damping body 5 is provided in the second box body 27. In this embodiment, the plug terminal 2 on the connector terminal is provided with a second vibration damping body 5, and the socket terminal 1 on the connector terminal is provided with a first vibration damping body 4 and a vibration damping arm 3. Through the cooperation of the first vibration damping body 4, the vibration damping arm 3 and the second vibration damping body 5, on the one hand, the first vibration damping body 4 and the second vibration damping body 5 provide shock absorption and energy dissipation for the entire connector terminal, and on the other hand, the vibration damping arm 3 provides sufficient positive pressure for the plugging together of the socket terminal 1 and the plug terminal 2, thereby ensuring the stability of the connection between the socket terminal 1 and the plug terminal 2. The first contact pin 21 and the second contact pin 22 are connected by means of a plug tail portion 28, and the plug tail portion 28 is connected to a wire.

Embodiment 9

Based on the Embodiment 8, as shown in FIG. 1, FIG. 6, and FIG. 7, a groove for the second vibration damping body 5 to insert is formed between the first contact pin 21 and the second contact pin 22, and a convex block for the second vibration damping body 5 to clamp is provided on an inner wall of the groove. The convex block comprises a first positioning convex block 23, a second positioning convex block 24, a third positioning convex block 25 and a fourth positioning convex block 26. The first positioning convex block 23 and the fourth positioning convex block 26 respectively clamp the upper and lower portions of the second vibration damping body 5, and the second positioning convex block 24 and the third positioning convex block 25 are respectively located at the upper and lower portions of the opening side of the groove. The first positioning convex block 23 and the fourth positioning convex block 26 are respectively located at the upper and lower portions of the second box body 27 so as to achieve the positioning of the upper and lower surfaces of the second vibration damping body 5. The second positioning convex block 24 and the third positioning convex block 25 are on the same plane and are located at the bottom portion of the second box body 27 to achieve positioning of the bottom surface. The width of the first positioning convex block 23 and the width of the second positioning convex block 24 are both half of the width of the bottom surface of the second box body 27, and the first positioning convex block 23 and the second positioning convex block 24 are arranged at an angle of 90°. Similarly, the width of the third positioning convex block 25 and the width of the fourth positioning convex block 26 are also half of the width of the bottom surface of the second box body 27, and the third positioning convex block 25 and the fourth positioning convex block 26 are arranged at an angle of 90°. The first positioning convex block 23 and the fourth positioning convex block 26 are respectively close to one side surface of the second box body 27 and are arranged alternately, thereby causing the second positioning convex block 24 and the third positioning convex block 25 to be arranged alternately as well, so as to fix the second box body 5 in the second box body 27.

Embodiment 10

Figure 8:
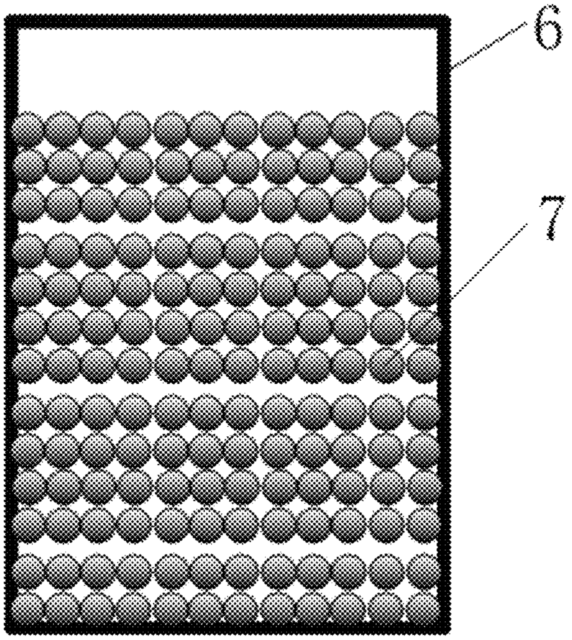
FIG. 8 is a schematic diagram of the first vibration damping body or the second vibration damping body of the present invention.

Based on the Embodiment 9, as shown in FIG. 8, the first vibration damping body 4 and the second vibration damping body 5 each comprise an outer housing body 6, a cavity is provided inside the outer housing body 6, and an internal shock-absorbing filler 7 is provided inside the cavity. The first vibration damping body 4 and the second vibration damping body 5 are both energy-dissipating components, wherein the outer housing body 6 is a sealed chamber structure with good sealing properties, which can ensure that the internal shock-absorbing filler 7 does not leak during use. The shape of the outer housing body 6 is consistent with the that of the first box body 14 or the second box body 27 for correct installation. The internal shock-absorbing filler 7 is composed of a soft small particle filler or a hard small particle filler or a soft and hard small particle filler. The arrangement of the particles in the cavity can be layered or irregular, as long as the filling rate meets the requirements. The particle filler with a size of 0.35 to 0.5 mm is a small particle filler, and the particle filler with a size greater than 0.5 mm is a large particle filler. The soft particles and hard particles are both high-density, heat-resistant, flame-retardant, non-conductive media. For example, the soft material is rubber particles, and the hard material is gravel or glass. The filling rate of the particles filling the outer housing body 6 is between 60% and 75%. When subjected to external vibration in any direction, the internal shock-absorbing filler composed of particles can move and collide in the chamber to achieve energy dissipation.

The above descriptions are only preferred embodiments of the present invention and are not intended to limit the present invention. Any modifications, equivalent replacements and improvements made within the spirit and principles of the present invention shall be comprised within the protection scope of the present invention.

The invention claimed is:

1. A connector terminal comprising a vibration-resistant socket terminal, wherein an interior of the socket terminal (1) is provided with a first vibration damping body (4), and an exterior of the socket terminal (1) is provided with a vibration damping arm (3); the socket terminal (1) comprises a base body (17), an upper spring plate (12) and a lower spring plate (16) are relatively arranged on the base body (17), the first vibration damping body (4) is provided inside the base body (17), and the vibration damping arm (3) is provided on the exteriors of the upper spring plate (12) and the lower spring plate (16); a socket tail portion (11) is provided on the base body (17), the base body (17) and the socket tail portion (11) are integrally formed, the interior of the base body (17) is a cavity, a folded edge (15) and a clamping block (13) are provided on the base body (17), the clamping block (13) and the folded edge (15) respectively clamp a front portion and a bottom portion of the first vibration damping body (4), so that the first vibration damping body (4) is tightly fitted with the upper spring plate (12) and the lower spring plate (16), and the clamping block (13) and the vibration damping arm (3) are matched in a locking manner; and the vibration damping arm (3) comprises connecting plates (36), a back plate (35) is provided on the connecting plates (36), the two connecting plates (36) are connected into one body through the back plate (35), the two connecting plates (36) and the back plate (35) form a U-shaped hole, the U-shaped hole is sleeved on the socket terminal (1), a front-end clamping plate (34) is provided at an open end of the U-shaped hole, the front-end clamping plate (34) and the clamping block (13) are matched in a locking manner, a top bend (33) configured to clamp the first vibration damping body (4) is provided at a top portion of the back plate (35), each connecting plate (36) at a top portion is connected to a vibration damping plate (31) and the vibration damping plate (31) is fitted with the upper spring plate (12) or the lower spring plate (16).

2. The connector terminal according to claim 1, further comprising:

a vibration-resistant plug terminal (2), wherein the plug terminal (2) includes a first contact pin (21) and a second contact pin (22) which are arranged opposite to each other, and a second vibration damping body (5) is arranged between the first contact pin (21) and the second contact pin (22); and the socket terminal is mutually pluggable with the plug terminal.

3. The connector terminal according to claim 2, wherein the plug terminal includes a groove for the second vibration damping body (5) to insert is formed between the first contact pin (21) and the second contact pin (22), and a convex block for the second vibration damping body (5) to clamp is provided on an inner wall of the groove.

4. The connector terminal according to claim 3, wherein the first vibration damping body (4) and the second vibration damping body (5) each comprise an outer housing body (6), a cavity is provided inside the outer housing body (6), and an internal shock-absorbing filler (7) is provided inside the cavity.

5. The connector terminal according to claim 1, wherein ends of the upper spring plate (12) and lower spring plate (16) are both bent inward, and a top portion of the vibration damping plate (31) is close to and tightly presses a bending point of the upper spring plate (12) or lower spring plate (16).

6. The connector terminal according to claim 5, further comprising:

a vibration-resistant plug terminal (2), wherein the plug terminal (2) includes a first contact pin (21) and a second contact pin (22) which are arranged opposite to each other, and a second vibration damping body (5) is arranged between the first contact pin (21) and the second contact pin (22); and the socket terminal is mutually pluggable with the plug terminal.

7. The connector terminal according to claim 6, wherein the plug terminal includes a groove for the second vibration damping body (5) to insert is formed between the first contact pin (21) and the second contact pin (22), and a convex block for the second vibration damping body (5) to clamp is provided on an inner wall of the groove.

8. The connector terminal according to claim 7, wherein the first vibration damping body (4) and the second vibration damping body (5) each comprise an outer housing body (6), a cavity is provided inside the outer housing body (6), and an internal shock-absorbing filler (7) is provided inside the cavity.

9. The connector terminal according to claim 5, wherein the bending point of the upper spring plate (12) and the bending point of the lower spring plate (16) are symmetrical, and a distance between the top portion of the vibration damping plate (31) and the bending point of the upper spring plate (12) is 0.2 mm-0.5 mm.

10. The connector terminal according to claim 9, further comprising:

a vibration-resistant plug terminal (2), wherein the plug terminal (2) includes a first contact pin (21) and a second contact pin (22) which are arranged opposite to each other, and a second vibration damping body (5) is arranged between the first contact pin (21) and the second contact pin (22); and the socket terminal is mutually pluggable with the plug terminal.

11. The connector terminal according to claim 10, wherein the plug terminal includes a groove for the second vibration damping body (5) to insert is formed between the first contact pin (21) and the second contact pin (22), and a convex block for the second vibration damping body (5) to clamp is provided on an inner wall of the groove.

12. The connector terminal according to claim 11, wherein the first vibration damping body (4) and the second vibration damping body (5) each comprise an outer housing body (6), a cavity is provided inside the outer housing body (6), and an internal shock-absorbing filler (7) is provided inside the cavity.

13. The connector terminal according to claim 9, wherein an arc groove (32) is provided at a joint between each pair of the connecting plate (36) and the vibration damping plate (31).

14. The connector terminal according to claim 13, further comprising:

a vibration-resistant plug terminal (2), wherein the plug terminal (2) includes a first contact pin (21) and a second contact pin (22) which are arranged opposite to each other, and a second vibration damping body (5) is arranged between the first contact pin (21) and the second contact pin (22); and the socket terminal is mutually pluggable with the plug terminal.

15. The connector terminal according to claim 14, wherein the plug terminal includes a groove for the second vibration damping body (5) to insert is formed between the first contact pin (21) and the second contact pin (22), and a convex block for the second vibration damping body (5) to clamp is provided on an inner wall of the groove.

16. The connector terminal according to claim 15, wherein the first vibration damping body (4) and the second vibration damping body (5) each comprise an outer housing body (6), a cavity is provided inside the outer housing body (6), and an internal shock-absorbing filler (7) is provided inside the cavity.

* * * * *